Dec. 12, 1950 A. D. ROBINSON 2,533,839
TOOTHPASTE EJECTOR

Filed May 17, 1948 2 Sheets-Sheet 1

Inventor

Allen D. Robinson

By Clarence A. O'Brien
and Harvey B. Jacobson
Attorneys

Dec. 12, 1950  A. D. ROBINSON  2,533,839
TOOTHPASTE EJECTOR

Filed May 17, 1948  2 Sheets-Sheet 2

Allen D. Robinson
INVENTOR.

BY Clarence A. O'Brien
and Harvey B. Jacobson
Attorneys

Patented Dec. 12, 1950

2,533,839

UNITED STATES PATENT OFFICE 2,533,839

TOOTHPASTE EJECTOR

Allen D. Robinson, Kenosha, Wis.

Application May 17, 1948, Serial No. 27,441

2 Claims. (Cl. 222—103)

This invention relates to a material dispensing device and more particularly to a device for dispensing a predetermined amount of paste or semifluid creams.

The primary object of this invention is to provide an efficient and compact paste ejector or dispenser for dispensing tooth paste, shaving cream or the like substance.

Another important object of this invention is to provide a paste dispenser, which is adapted for attachment to a vertical support and which, responsive to a simple actuating means will function to dispense a predetermined amount of paste.

A meritorius feature of this invention resides in the provision of means for compressing a tube of paste so that the paste is forced from the tube into a discharge casing.

Another important feature of this invention resides in the provision of means for closing off communication between a detachably mounted paste container and a discharging orifice and means for dispensing a predetermined amount of paste from the orifice, said foregoing means being successively actuated by a common actuating member, so that the amount of paste, which is dispensed, can be easily and conveniently controlled.

Another meritorius feature of this invention resides in the provision of a slidably disposed piston and slidably disposed valve, the same functioning to control the amount of paste dispensed from the housed paste container and the same being operable in opposite directions for successively closing off a discharge chamber and opening a dispensing orifice, the same being correspondingly and coincidentally actuated by a common operating element.

These and ancillary objects and other meritorious features are attained by this invention, preferred embodiments of which are set forth in the following description and illustrated in the accompanying drawings, wherein.

Figures 1, 2, 3:
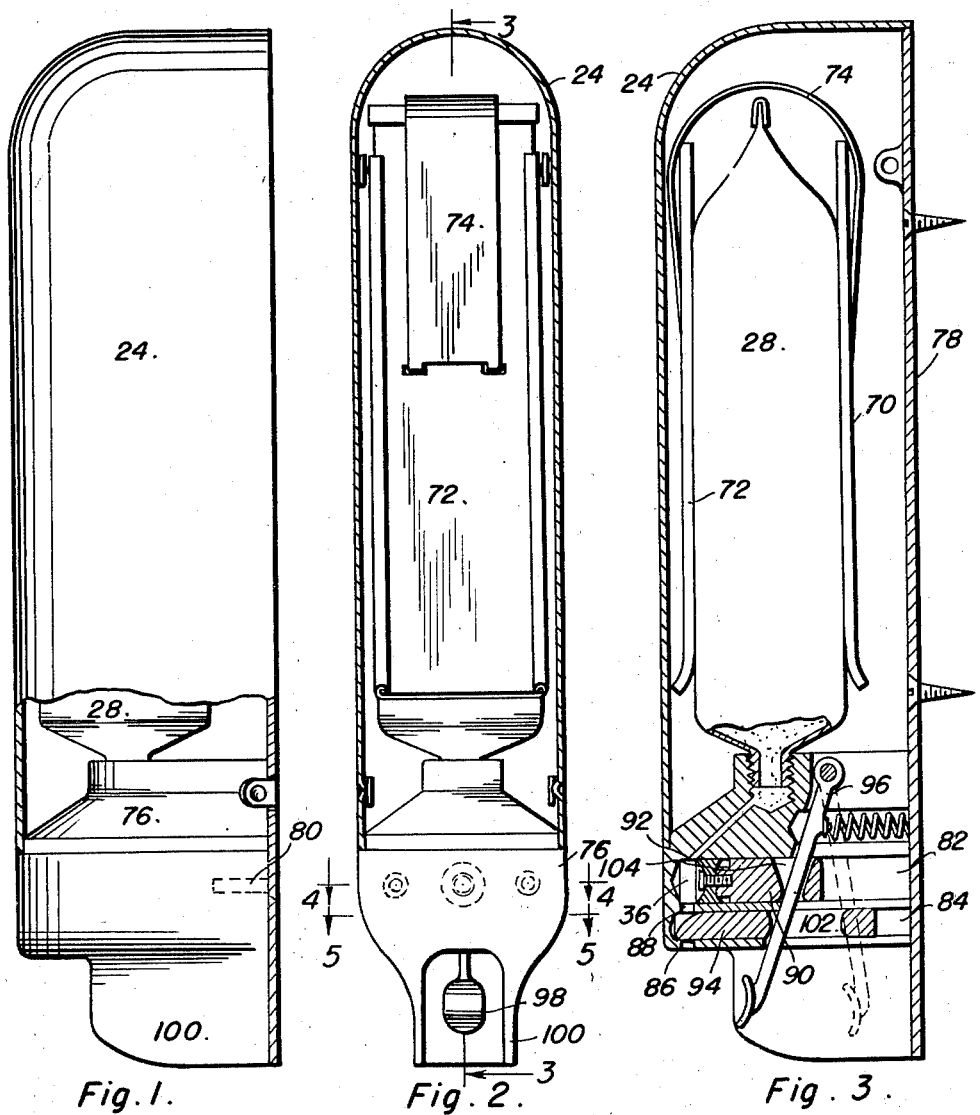
Figure 1 is a side elevational view of this invention, with a portion of the housing broken away, illustrating the detachably mounted paste tube disposed therein.
Figure 2 is an end elevational view of this invention, showing the housing in vertical sectional view and illustrating the tube disposed under compression in the housing.
Figure 3 is a vertical sectional view taken substantially on the plane of line 3—3 of Figure 2.
Figure 4:
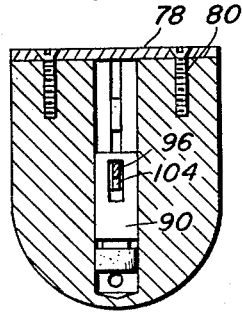
Figure 4 is a transverse sectional view taken substantially on the plane of line 4—4 of Figure 2.
Figure 5:
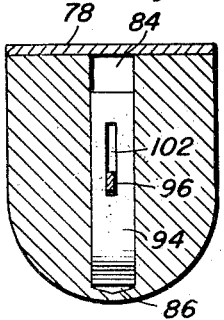
Figure 5 is a transverse sectional view taken on the plane of line 5—5 of Figure 2.
Figure 6:
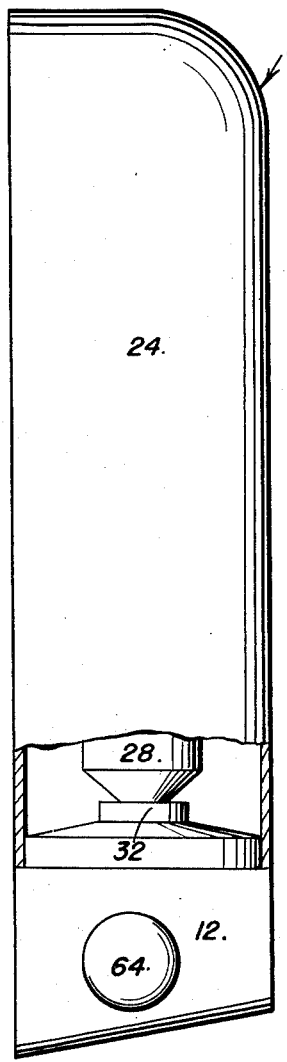
Figure 6 is a side elevational view modified form of this invention.
Figure 7:
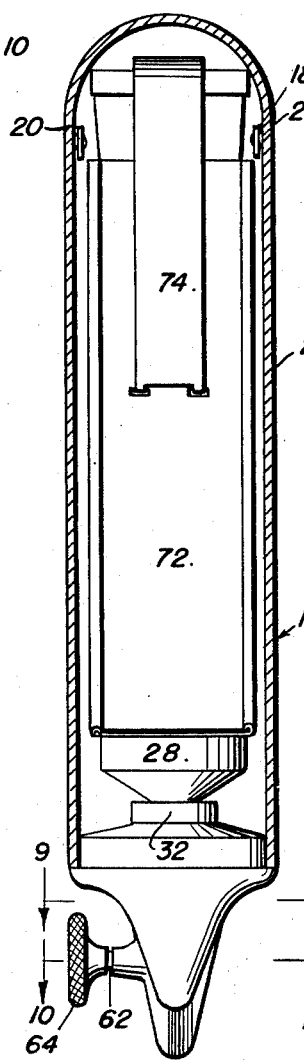
Figure 7 is an end elevational view of this invention, with the housing being shown in section to illustrate the detachably housed case container or tube.

Referring now more particularly to the drawings, wherein similar characters of reference designate corresponding parts throughout, and in particular to Figures 6–10, inclusive thereof, wherein one embodiment of this invention is illustrated, the character reference 10 generally designates this invention. This invention comprises a casing 12, having an integrally formed and upwardly extending supporting wall 14, which is adapted to be attached to a vertical support by means of screws 16 or other suitable securing means. Extending outwardly in lateral fashion from the supporting wall 14 are a pair of opposed indented plates 18 and 20. A housing wall 24 is seated on the casing 12 and secured thereto. Detents 26 extend inwardly from the housing wall 24 and are adapted to engage the indented brackets 18 and 20.

A conventional paste container or tube 28 is disposed within the housing defined by the walls 14 and 24 and is detachably secured to the casing 12. The tube 28 has a customary exteriorly threaded discharging neck 30, which is threaded into an extending boss 32, having an internally threaded bore formed centrally therein. A passage 34 communicates the tube 28 with a material or paste chamber formed in the casing. A discharging or dispensing orifice 38 depends from the chamber 36 and serves to discharge the material from the tube or container 28. A substantially cylindrical cavity 40 is formed transversely through the casing in horizontal alignment with the chamber 36 and is adapted to slidably retain a piston 42 disposed therein. A rubber cup or sealing ring 44 is disposed on the forward end of the piston 42 in association with a locking washer 46 and a securing element 48, inserted into the body of the piston. Resilient means 50 is disposed between the end wall of the casing and the face of the piston and serves to urge or bias the piston against a stop 52 extending into the cylindrical cavity. A cylindrical cavity or guideway 54 is formed in the casing adjacent the depending end thereof and serves to slidably retain a valve 56, which is adapted to close off the orifices 38. Suitable means is provided for maintaining the valve 56 in a closure placement in the orifice 38 and comprises a compression spring 58, which is adjustably secured by a set screw 60 at the opposite end of the cylindrical cavity.

Suitable means is provided for actuating the piston and the valve and preferably comprises a common actuating element, which moves the piston and the valve in opposite directions, so that the piston closes off communication between the chamber 36 and the tube 28, while simultaneously the valve 56 allows the paste or material to be discharged through the orifice 38. The means preferred comprises a star wheel 60, which is journalled within the casing in operative engagement with the piston and the valve and is rotated through the medium of an extending shaft 62 and a finger wheel 64 secured on the projected end of the shaft. Notches or slots 68 are disposed in the valve 56 for accommodating the prong ends of the star wheel, while the radial projections of the wheel are adapted to engage the convex rear surface of the piston.

Figure 8:
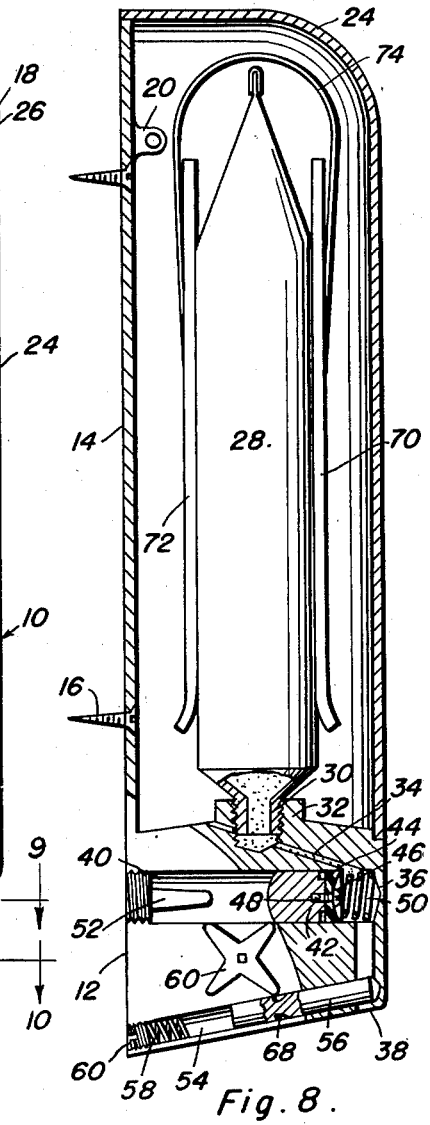
Figure 8 is a vertical sectional view of this invention, showing the housed tube in elevation.
Figure 9:
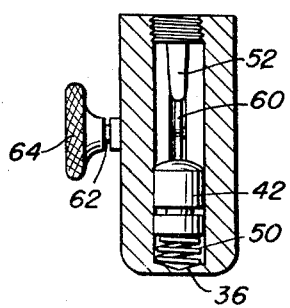
Figure 9 is a transverse sectional view taken on the plane of line 9—9 of Figure 7.
Figure 10:
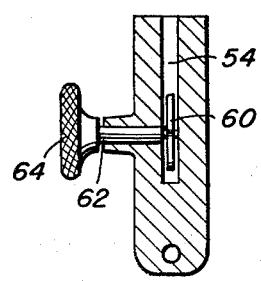
Figure 10 is a transverse sectional view taken on line 10—10 of Figure 7.

Thus, rotation of the star wheel, with reference to Figure 8 of the drawings, moves the valve 56 out of closure placement in the orifice 38 and allows the paste in the chamber 36 to move therethrough. At the same time, the piston is moved forwardly, against the spring, by the engagement of the prongs of the star wheel with the rear surface of the piston, so that communication between the tube and the chamber is cut off.

Suitable means is provided for compressing the tube 28, so that at all times the paste or material is positively discharged from the tube. The compressing means provided comprises a pair of plates 70 and 72 which are disposed on opposite sides of the tube and are connected at their upper ends by a spring bar 74, which encircles the upper end of the tube. Thus, the plates are at all times moved inwardly in coactive compression on the tube, through the medium of the spring bar.

Attention is now directed to another modified form, disclosed in Figures 1-5, inclusive, of the drawings, wherein a casing 76 is provided and is adapted to be detachably supported on a vertical support through the medium of a supporting rear wall 78, which is secured to the casing, at the rear portion thereof, through the medium of a securing screw or the like 80. The tube 28 is secured within the casing in a detachable and removable manner and communicates with a chamber 36 formed therein. A pair of horizontally disposed cavities or guideways 82 and 84 are transversely disposed in the casing, the cavity or guideway 82 being in horizontal alignment with the chamber 36, while the cavity 84 is disposed below the cavity 82 and parallel therewith. Of course, vertically aligned discharging or dispensing orifice 86 and 88 are disposed in the casing in vertical alignment with the chamber 36. A piston 90 is slidably disposed in the guideway 82 and includes a seal ring case 92 secured to the face of the piston.

A valve plate 94 is slidably disposed within the guideway 84 and serves to close off the orifice 86. Common actuating means is provided for moving the piston and the valve out of closure placement over the aligned orifices and preferably comprises a pivotally mounted actuating lever 96, having a concave operating face 98 depending between a pair of opposed guide walls 100, which depend from the bottom of the casing. The actuating lever 96 is disposed within a slot 102 of the valve plate 94 and a smaller vertical opening 104 in the piston 90.

Thus, as the head of the tooth brush is moved against the face 98 of the actuating lever, the lever is moved about its horizontal axis, causing the piston and valve to move out of closure placement and allowing the paste or cream to be dispensed from the tube into the chamber and through the discharging orifices.

Thus, it can be seen that there is provided a compact and efficient paste or cream ejector or dispenser, which may be easily attached on a vertical support and which is adapted for use as a tooth paste ejector.

However, since many other purposes and objects of this invention will become apparent to those skilled in the art, upon a perusal of the foregoing description, in view of the accompanying drawings, it is to be understood that certain changes may be effected thereon, as coming within the spirit of the invention and the scope of the appended claims.

Having described the invention, what is claimed as new is:

1. A paste dispenser comprising a casing adapted to be secured to a vertical support, a housing detachably mounted on the casing, said housing being adapted to have an inverted paste tube disposed therein with one end of the tube being detachably attached to the casing, a chamber in said casing, said chamber having a discharging orifice, a communicating passage between the attached end of the tube and the chamber, means for compressing the tube to constantly force the paste through the passage into the chamber, a piston slidably disposed in the chamber, sealing means formed on one end of the piston, said sealing means being adapted to close off the passage, resilient means for normally retaining said sealing means out of an operative position, said resilient means being positioned in the chamber and bearing against the sealing means, a valve slidably disposed in the casing below the piston and adapted to move transversely in the discharge orifice, means journalled in the casing being engageable with the piston and valve for moving the valve in one direction to uncover the discharging orifice and for simultaneously moving the piston in the opposite direction to close off the communicating passage.

2. A paste dispenser comprising a casing adapted to be secured to a vertical support, a housing detachably mounted on the casing, said housing being adapted to have an inverted paste tube disposed therein with one end of the tube being detachably attached to the casing, a chamber in said casing, said chamber having a discharging orifice, a communicating passage between the attached end of a paste tube and the chamber, means for compressing the tube to constantly force the paste therein through the passage into the chamber, a piston slidably disposed in the chamber, sealing means formed on one end of the piston, said sealing means being adapted to close off the passage, resilient means for normally retaining said sealing means out of an operative position, said resilient means being positioned in the chamber and bearing against the sealing means, a valve slidably disposed in the casing below the piston and adapted to move transversely in the discharge orifice, a star wheel rotatably journalled in said casing, said valve being formed with slots to operatively receive the extending arms of the star wheel, means formed on one end of said piston for receiving the arms of the star wheel whereby rotation of the star wheel moves the piston forwardly and slides the valve rearwardly.

ALLEN D. ROBINSON.

REFERENCES CITED

The following references are of record in the file of this patent:

UNITED STATES PATENTS

| Number | Name | Date |
| --- | --- | --- |
| 1,654,549 | Mohun | Jan. 3, 1928 |
| 2,373,171 | Daly | Apr. 10, 1945 |

FOREIGN PATENTS

| Number | Country | Date |
| --- | --- | --- |
| 444,557 | Great Britain | Dec. 22, 1934 |